United States Patent
Yi et al.

(10) Patent No.: US 10,536,834 B2
(45) Date of Patent: Jan. 14, 2020

(54) METHOD AND APPARATUS FOR PERFORMING D2D OPERATION IN WIRELESS COMMUNICATION SYSTEM

(71) Applicant: LG Electronics Inc., Seoul (KR)

(72) Inventors: Yunjung Yi, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/543,074

(22) PCT Filed: Jan. 26, 2016

(86) PCT No.: PCT/KR2016/000826
§ 371 (c)(1),
(2) Date: Jul. 12, 2017

(87) PCT Pub. No.: WO2016/122192
PCT Pub. Date: Aug. 4, 2016

(65) Prior Publication Data
US 2018/0007494 A1    Jan. 4, 2018

Related U.S. Application Data

(60) Provisional application No. 62/108,042, filed on Jan. 26, 2015.

(51) Int. Cl.
*H04W 4/70* (2018.01)
*H04W 76/14* (2018.01)
(Continued)

(52) U.S. Cl.
CPC ............. *H04W 4/70* (2018.02); *H04W 52/34* (2013.01); *H04W 52/383* (2013.01);
(Continued)

(58) Field of Classification Search
CPC combination set(s) only.
See application file for complete search history.

(56) References Cited

U.S. PATENT DOCUMENTS

2010/0054237 A1    3/2010    Han et al.
2014/0094183 A1    4/2014    Gao et al.
(Continued)

FOREIGN PATENT DOCUMENTS

WO    2014175149    10/2014

OTHER PUBLICATIONS

HTC, "D2D Re-synchronization Procedure in Varied Coverage," R1-144925, 3GPP TSG RAN WG1 Meeting #79, Nov. 8, 2014, see pp. 1-3.

(Continued)

*Primary Examiner* — Zhitong Chen
(74) *Attorney, Agent, or Firm* — Dentons US LLP

(57) ABSTRACT

A method and apparatus for performing a device-to-device (D2D) operation in a wireless communication system is provided. In one embodiment, a user equipment (UE) receives a configuration of a reference timing for a cell of first carrier, based on a timing of a primary cell (PCell) of a second carrier, and performs D2D operation with another UE on the cell of the first carrier according to the reference timing. In another embodiment, a UE allocates a D2D transmission power based on an uplink (UL) transmission power for dual connectivity, and performs D2D operation with another UE according to the D2D transmission power.

4 Claims, 10 Drawing Sheets

(51) Int. Cl.
*H04W 56/00* (2009.01)
*H04W 52/34* (2009.01)
*H04W 52/38* (2009.01)
*H04W 72/04* (2009.01)
*H04W 76/15* (2018.01)

(52) U.S. Cl.
CPC ..... *H04W 56/002* (2013.01); *H04W 72/0446* (2013.01); *H04W 76/14* (2018.02); *H04W 76/15* (2018.02)

(56) References Cited

U.S. PATENT DOCUMENTS

| | | | |
|---|---|---|---|
| 2016/0021625 A1* | 1/2016 | Li | H04W 72/1289 370/336 |
| 2016/0174181 A1* | 6/2016 | Fujishiro | H04W 76/14 455/435.1 |
| 2017/0223760 A1* | 8/2017 | Adachi | H04W 76/023 |
| 2017/0366313 A1* | 12/2017 | Rahman | H04W 72/085 |

OTHER PUBLICATIONS

Alcatel-Lucent Shanghai Bell, et al., "D2D synchronization and re-synchronization procedure," R1-144687, 3GPP TSG RAN WG1 Meeting #79, Nov. 8, 2014, see pp. 1-4.

* cited by examiner

[Fig. 1]
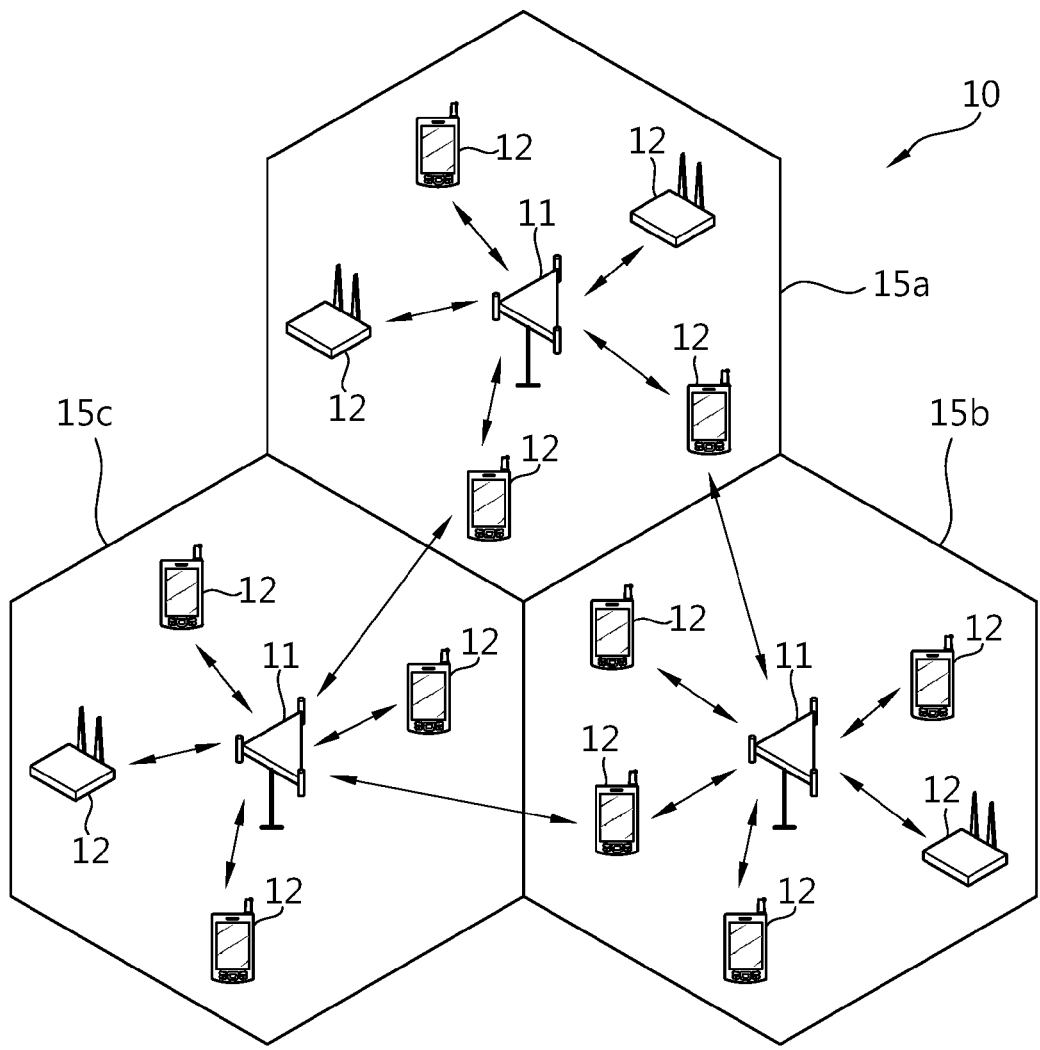
[Fig. 2]
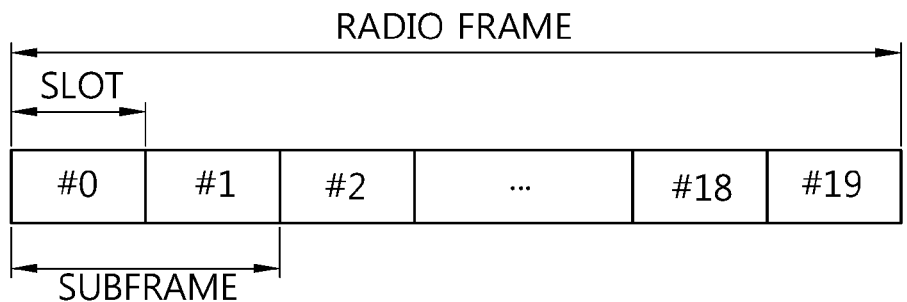

[Fig. 3]
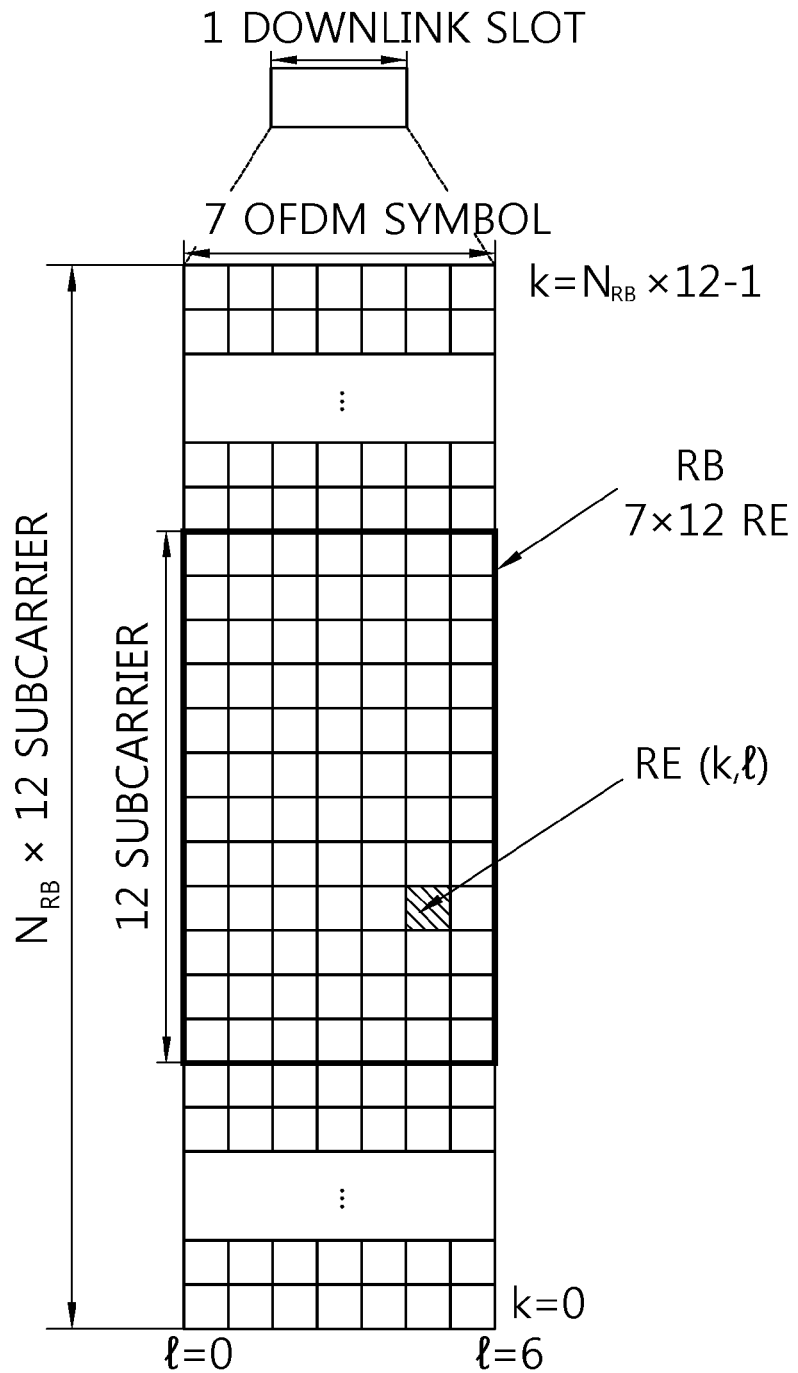

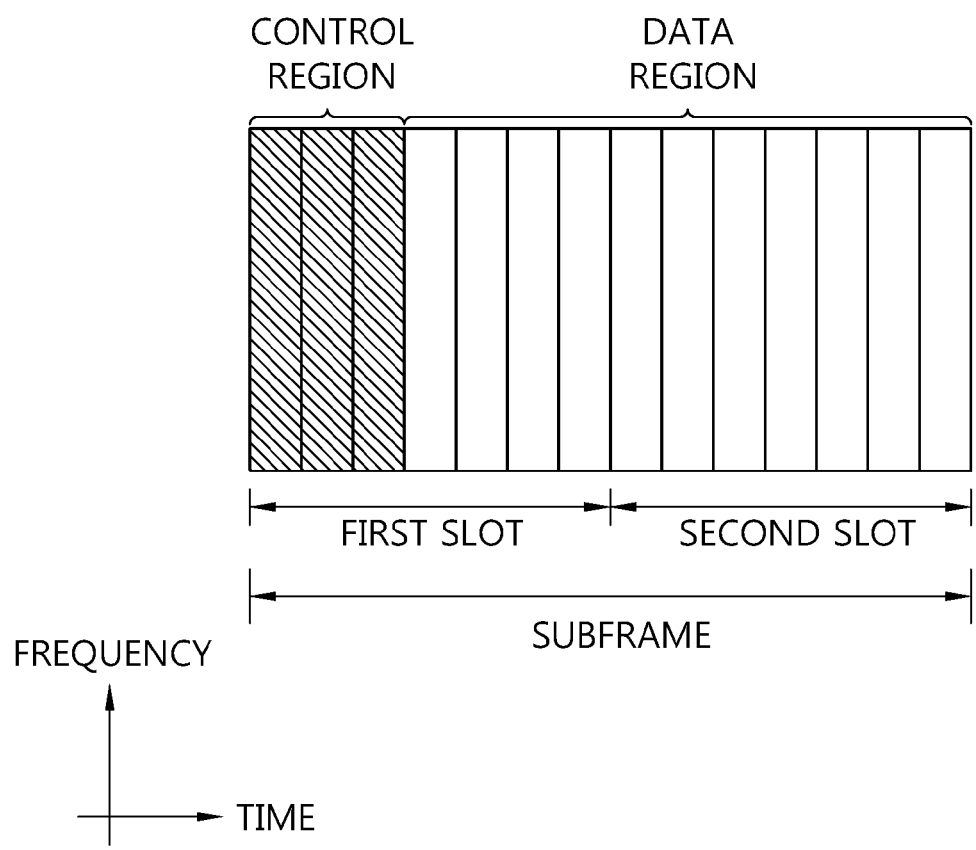
[Fig. 4]

[Fig. 5]
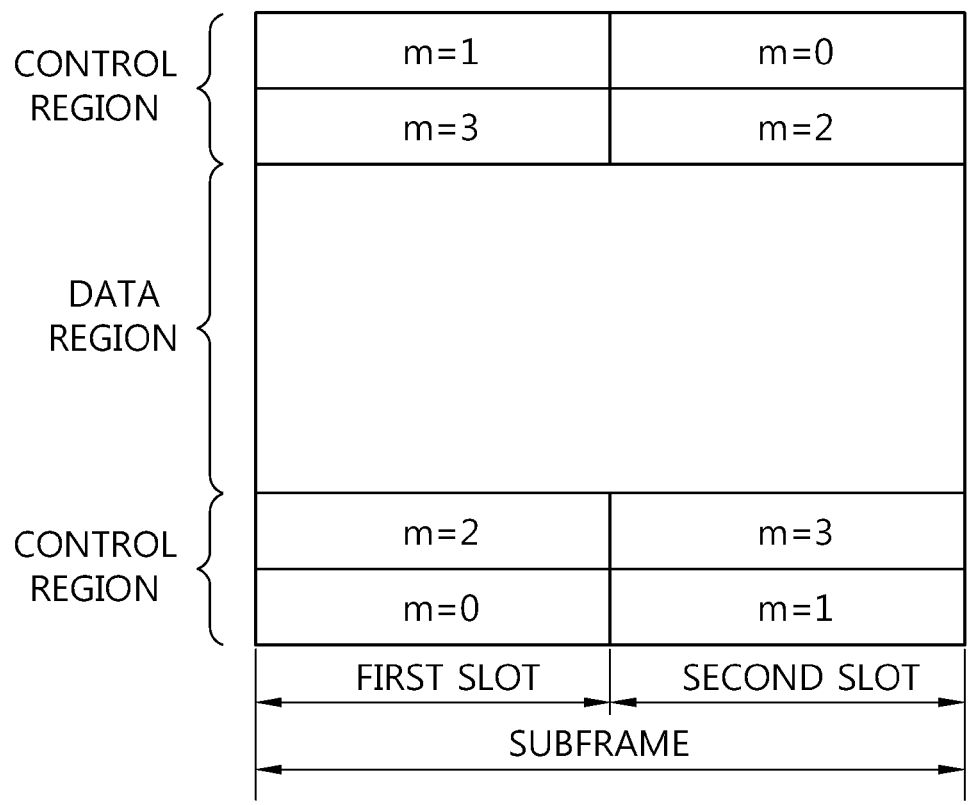

[Fig. 6]
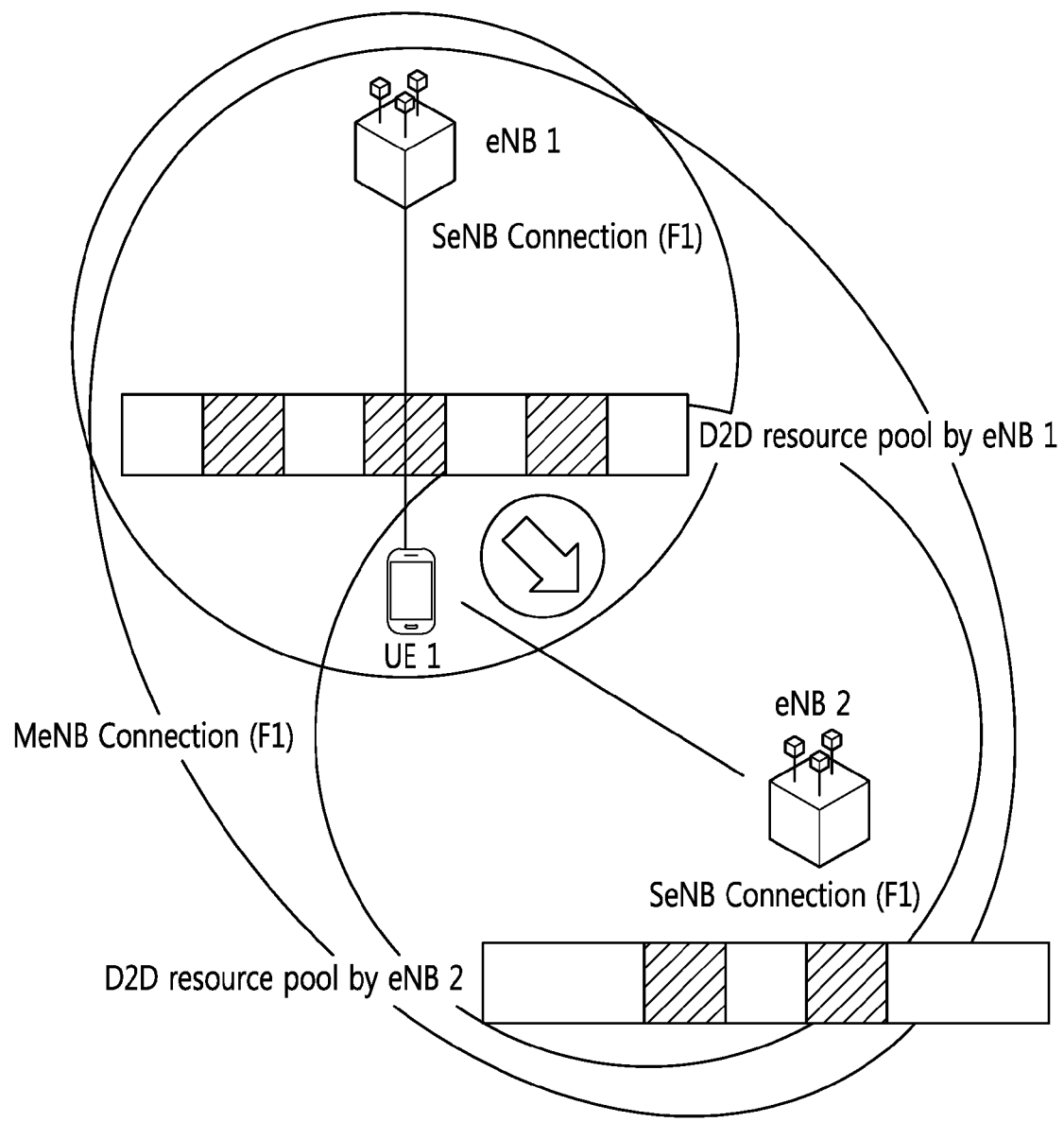

[Fig. 7]
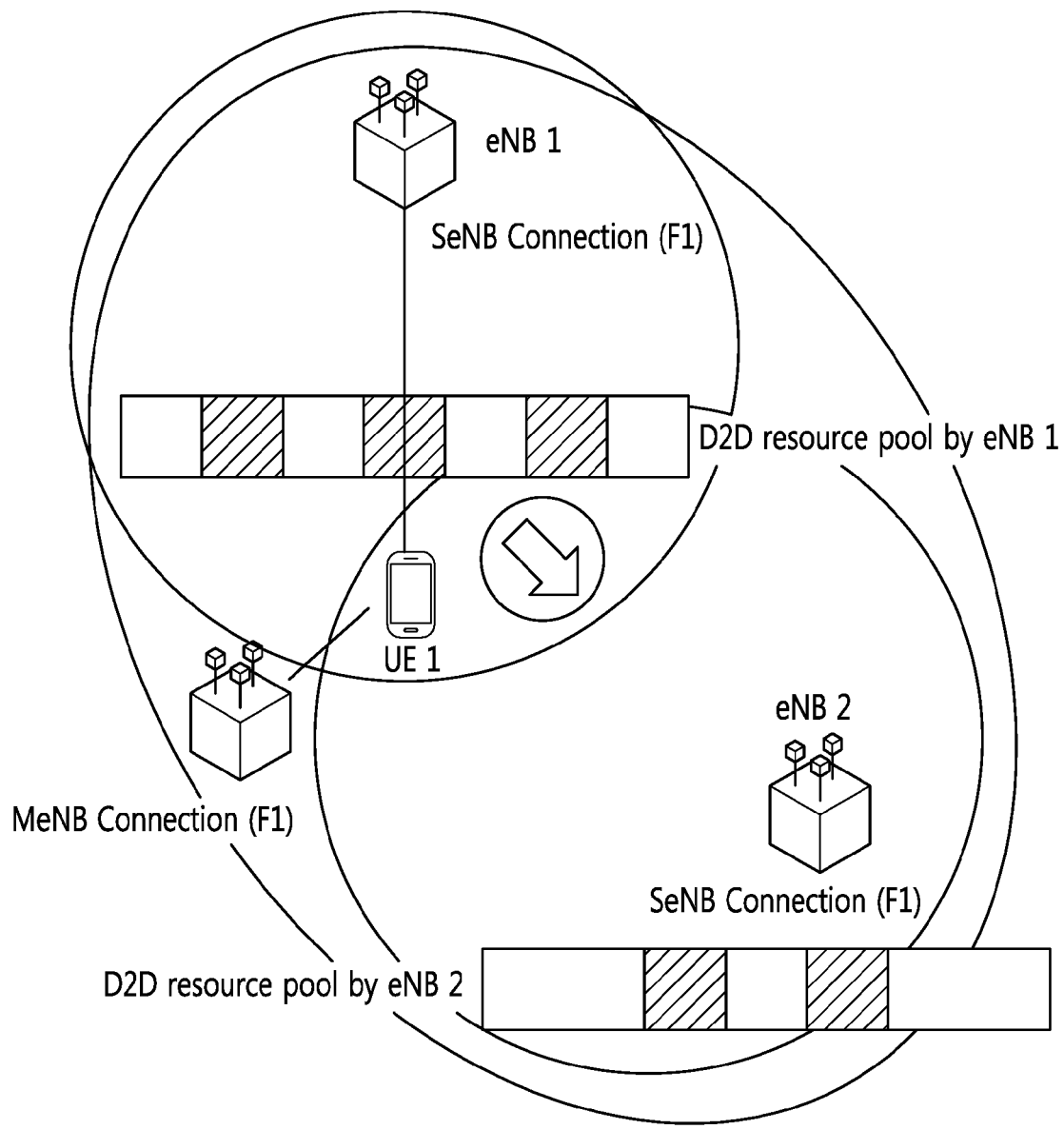

[Fig. 8]
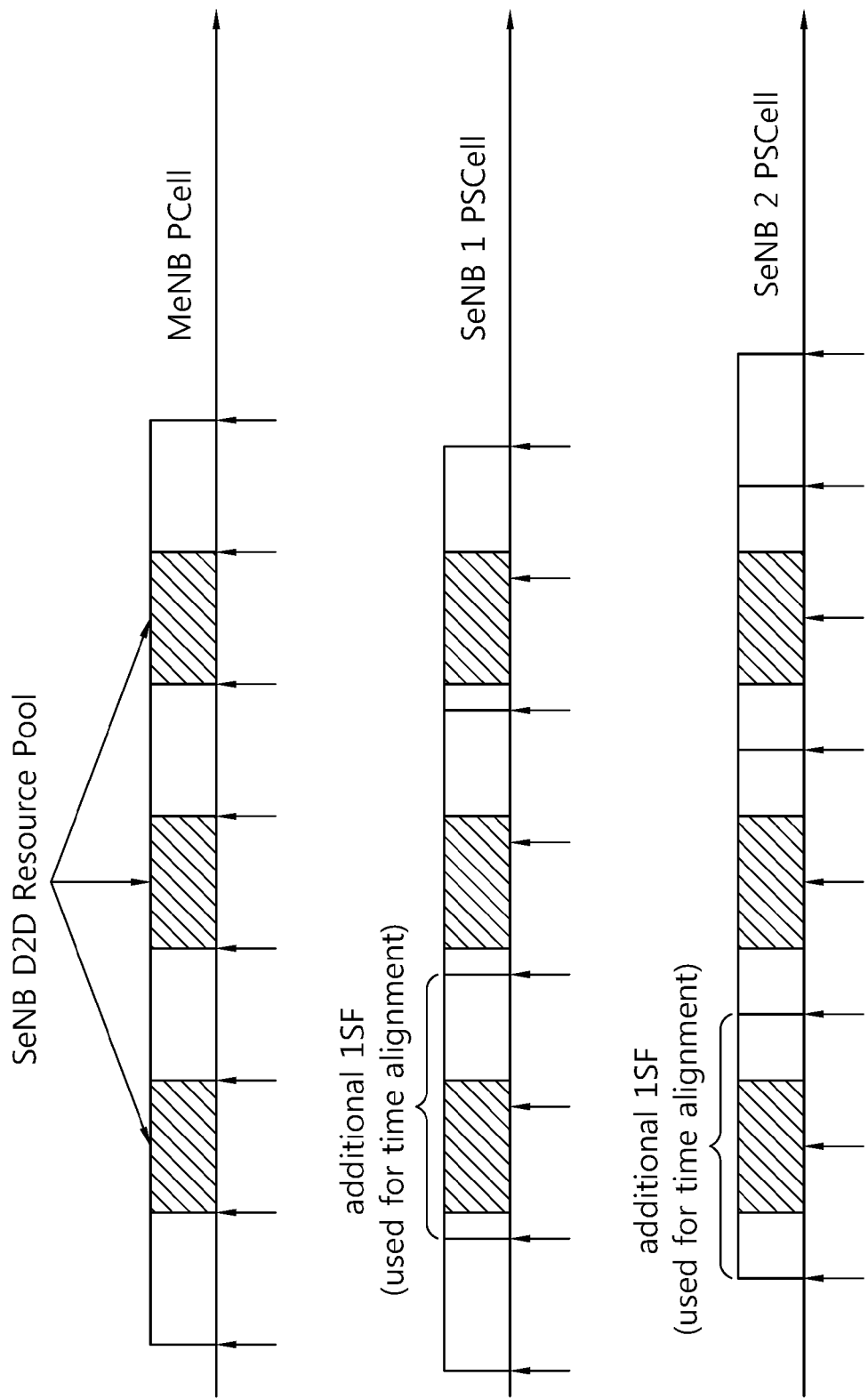

[Fig. 9]
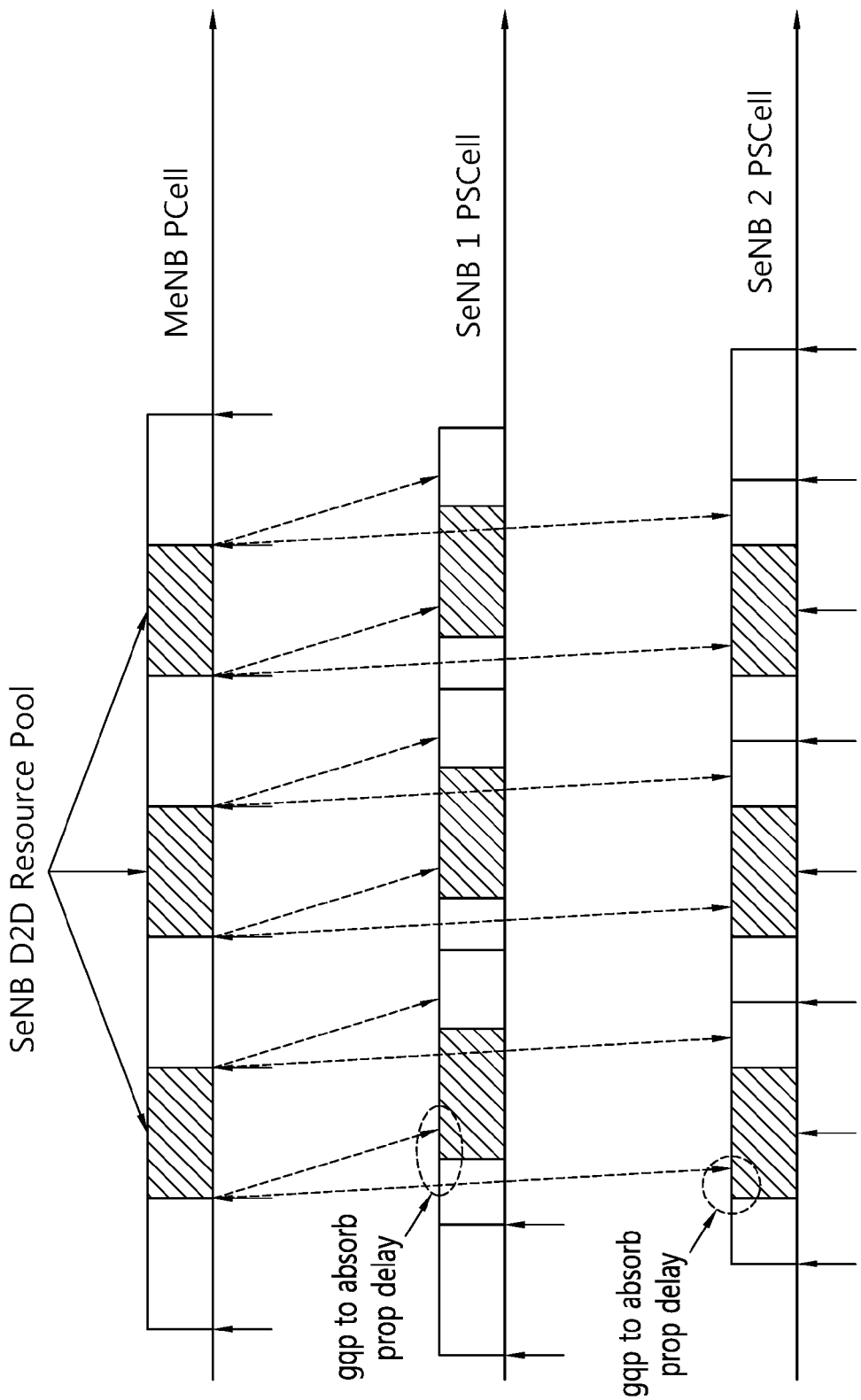

[Fig. 10]
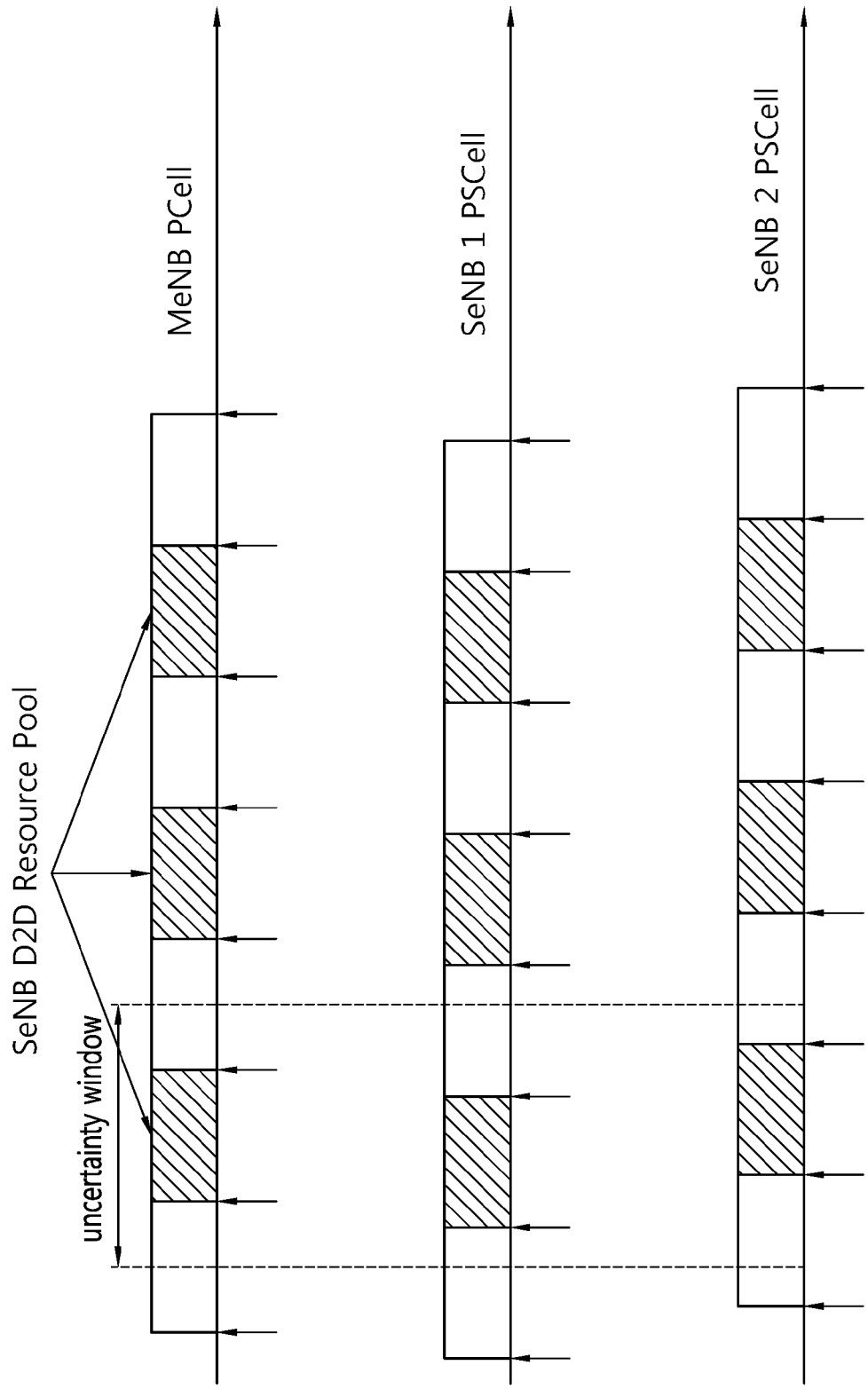

[Fig. 11]
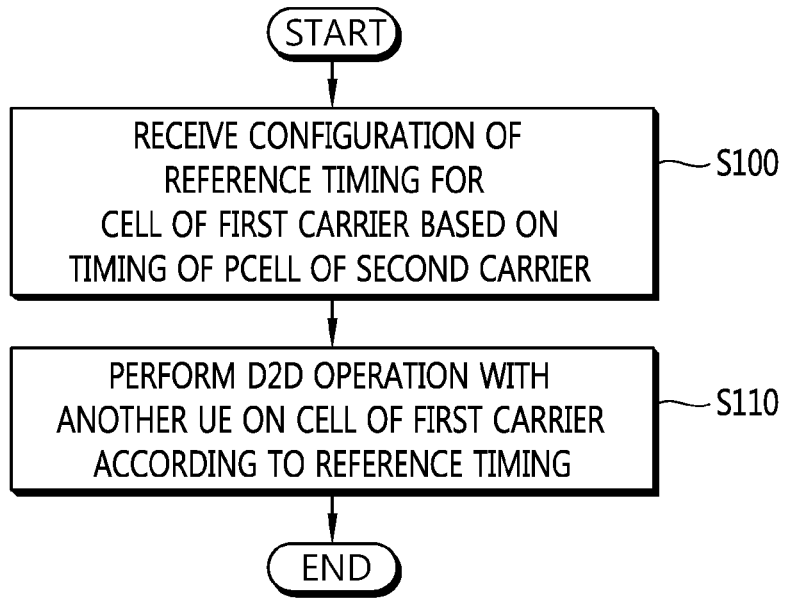
[Fig. 12]
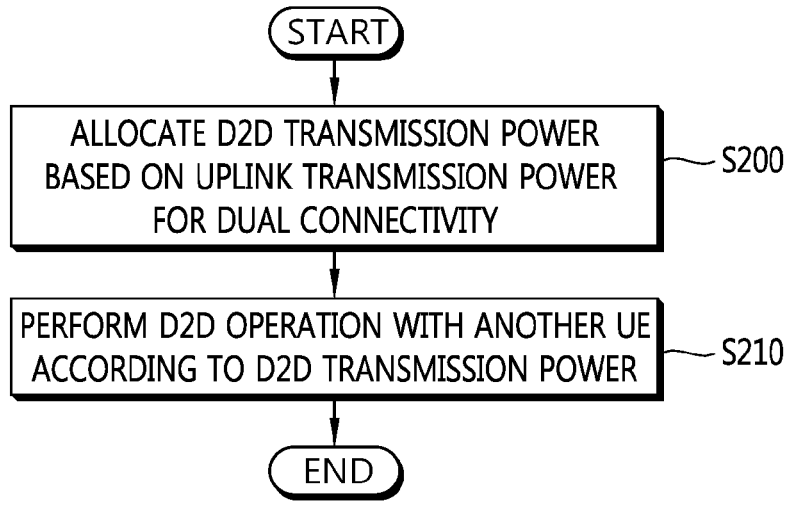
[Fig. 13]
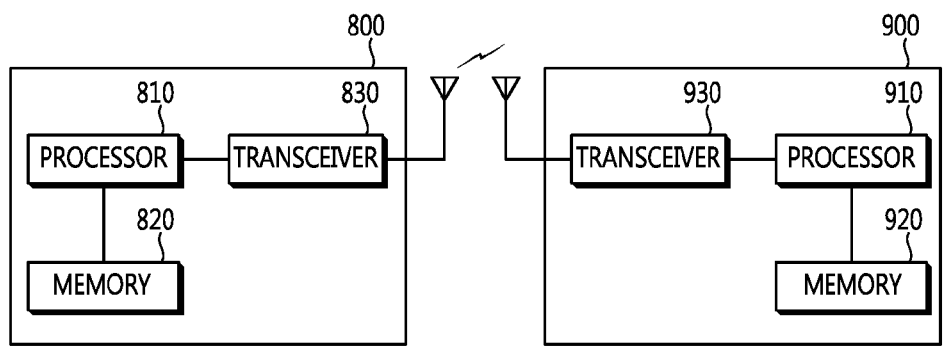

METHOD AND APPARATUS FOR PERFORMING D2D OPERATION IN WIRELESS COMMUNICATION SYSTEM

CROSS-REFERENCE TO RELATED APPLICATIONS

This application is the National Stage filing under 35 U.S.C. 371 of International Application No. PCT/KR2016/000826, filed on Jan. 26, 2016, which claims the benefit of U.S. Provisional Application No. 62/108,042 filed on Jan. 26, 2015, the contents of which are all hereby incorporated by reference herein in their entirety.

BACKGROUND OF THE INVENTION

Field of the Invention

The present invention relates to wireless communications, and more particularly, to a method and apparatus for performing a device-to-device (D2D) operation in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. Accordingly, a method for performing D2D operation in dual connectivity or in multiple-carriers may be required.

SUMMARY OF THE INVENTION

The present invention provides a method and apparatus for performing a device-to-device (D2D) operation in a wireless communication system. The present invention discusses techniques/mechanisms to enable D2D operation in dual connectivity scenario. The present invention discusses techniques/mechanisms to enable D2D operation in multiple-carriers scenario. The present invention also discusses issue with timing and power when D2D operation is enabled in dual connectivity scenario. The present invention also discusses how to utilize dual connectivity for efficient D2D operation in high speed environments and/or in vehicle-to-everything (V2X) communication.

In an aspect, a method for performing, by a user equipment (UE), a device-to-device (D2D) operation in a wireless communication system is provided. The method includes receiving a configuration of a reference timing for a cell of first carrier, based on a timing of a primary cell (PCell) of a second carrier, and performs D2D operation with another UE on the cell of the first carrier according to the reference timing.

In another aspect, a method for performing, by a user equipment (UE), a device-to-device (D2D) operation for dual connectivity in a wireless communication system is provided. The method includes allocating a D2D transmission power based on an uplink (UL) transmission power for dual connectivity, and performing D2D operation with another UE according to the D2D transmission power.

A device-to-device (D2D) operation can be performed efficiently in dual connectivity scenario or multiple-carriers scenario.

BRIEF DESCRIPTION OF THE DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a dual connectivity scenario for D2D operation according to an embodiment of the present invention.

FIG. 7 shows another example of a dual connectivity scenario for D2D operation according to an embodiment of the present invention.

FIG. 8 shows an example of resource pool based on timing of PCell of MeNB according to an embodiment of the present invention.

FIG. 9 shows another example of resource pool based on timing of PCell of MeNB according to an embodiment of the present invention.

FIG. 10 shows another example of resource pool based on timing of PCell of MeNB according to an embodiment of the present invention.

FIG. 11 show a method for performing a D2D operation according to an embodiment of the present invention.

FIG. 12 shows a method for performing a D2D operation in dual connectivity according to another embodiment of the present invention.

FIG. 13 shows a wireless communication system to implement an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Carrier aggregation (CA) is described. In CA, two or more component carriers (CCs) are aggregated in order to support wider transmission bandwidths up to 100 MHz. A UE may simultaneously receive or transmit on one or multiple CCs depending on its capabilities. A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

Dual connectivity (DC) is described. In 3GPP Rel-12, dual connectivity was introduced which allows dual connection to two independent eNBs with different timing reference. The E-UTRAN may support dual connectivity operation whereby a multiple RX/TX UE in RRC_CONNECTED is configured to utilize radio resources provided by two distinct schedulers, located in two eNBs connected via a non-ideal backhaul over the X2 interface. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB. That is, dual connectivity allows feasibility of maintaining mobility aspect via MeNB connection whereas data offloading can be performed at the same time via SeNB connection.

In DC, the radio protocol architecture that a particular bearer uses depends on how the bearer is setup. Three alternatives exist, master cell group (MCG) bearer, secondary cell group (SCG) bearer and split bearer. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Inter-eNB control plane signaling for dual connectivity is performed by means of X2 interface signaling. Control plane signaling towards the mobility management entity (MME) is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

U-plane connectivity depends on the bearer option configured. For MCG bearers, the MeNB is U-plane connected to the serving gateway (S-GW) via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Proximity-based services (ProSe) are described. "ProSe" may be used mixed with "D2D" (i.e. device-to-device). ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

UE performs ProSe direct communication on subframes defined over the duration of sidelink control period. The sidelink control period is the period over which resources allocated in a cell for sidelink control and sidelink data transmissions occur. Within the sidelink control period, the UE sends a sidelink control followed by data. Sidelink control indicates a layer 1 ID and characteristics of the transmissions (e.g. modulation and coding scheme (MCS), location of the resource(s) over the duration of sidelink control period, timing alignment).

For ProSe direct communication, the UE supporting ProSe direct communication can operate in two modes for resource allocation, which include Mode 1 (scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of sidelink control and data. The UE sends a scheduling request (dedicated scheduling request (D-SR) or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured sidelink radio network temporary identifier (SL-RNTI). In Mode 2, a UE on its own selects resources from resource pools to transmit sidelink control and data.

ProSe direct discovery is defined as the procedure used by the UE supporting direct discovery to discover other UE(s) in its proximity, using E-UTRA direct radio signals via PC5. ProSe direct discovery is supported only when the UE is served by E-UTRAN.

There are two types of resource allocation for discovery message announcement, which include Type 1 (UE autonomous resource selection) and Type 2 (scheduled resource allocation). Type 1 is a resource allocation procedure where resources for announcing of discovery message are allocated on a non UE specific basis. In Type 1, the eNB provides the UE(s) with the resource pool configuration used for announcing of discovery message. The configuration may be signaled in broadcast or dedicated signaling. The UE autonomously selects radio resource(s) from the indicated resource pool and announce discovery message. The UE can announce discovery message on a randomly selected discovery resource during each discovery period. Type 2 is a resource allocation procedure where resources for announcing of discovery message are allocated on per UE specific basis. In Type 2, the UE in RRC_CONNECTED may request resource(s) for announcing of discovery message from the eNB via radio resource control (RRC). The eNB assigns resource(s) via RRC. The resources are allocated within the resource pool that is configured in UEs for monitoring.

D2D communication, which allows direct communication between devices without going through infrastructure (i.e. network), has wide-range of potential applications including vehicle-to-vehicle (V2V) communication, proximity communication, etc. For example, in V2V communication, due to its nature of high speed, even though device(s) could have network coverage, it may experience frequent handover and RRC reconfiguration. Considering that safety related operation may also require connectivity to infrastructure while performing D2D operations, it may be considered that a UE supporting D2D operation in such scenarios may be equipped with multiple TX/RX capabilities. Particularly, in order to allow efficient D2D communication, it may be assumed that a UE has at least two TX capabilities, one of which is TX capability for wide area network (WAN) operation (e.g. network communication) and the other is TX capability for D2D operation, respectively.

Further, for D2D operation and/or V2V operation, dual connectivity architecture may be applied. In this case, mobility may be handled via a virtual cell (MeNB connection), and D2D operation may be handled via SeNB connection. Change of a SCell may be done via SCell change in dual connectivity. When dual connectivity is applied for D2D operation, in a specific frequency, resource pool may be configured differently by each eNB or at least timing may not be aligned. That is, a UE may need to reacquire synchronization source (either eNB or UE) to be able to utilize the new resource pool for D2D operation. Therefore, a method for minimizing the interruption time during D2D resource pool change or time reacquisition latency may be required.

In order to solve the problem described above, a method for performing D2D operation in dual connectivity scenario or multiple-carriers scenario is proposed according to embodiments of the present invention. The present invention may be useful for V2V operation in which the switch/handover among cells may occur relatively frequently due to high speed and thus efficient switching mechanism/coordination mechanism among cells may be necessary. In the description below, a method for performing D2D operation in dual connectivity scenario is described for the sake of convenience. However, the present application may be applied to a method for performing D2D operation in multiple-carriers scenario without loss of generality.

Overall two scenarios may be considered to apply dual connectivity for D2D operation.

FIG. 6 shows an example of a dual connectivity scenario for D2D operation according to an embodiment of the present invention. Referring to FIG. 6, the UE is connected to eNB1 and eNB2 by SeNB connection on frequency F1. Further, the UE is connected to MeNB by MeNB connection on frequency F1. The MeNB connection may be virtual MeNB connection by collaborating SeNBs in the same frequency. That is, the UE is equipped with only one frequency or the network offers only one frequency (i.e. frequency F1). WAN operation and D2D operation may occur simultaneously. WAN operation and D2D operation may be assumed to be occurred in the same frequency. In such a case, to maintain connectivity, a virtual cell (larger coverage created by collaborating physical cells of SeNBs) may be considered. In this case, if timing between MeNB and SeNB (or MCG and SCG) is not aligned, a UE may need to maintain two different synchronization to each connection respectively. If resource pool is configured based on MCG timing, continuous maintenance on MCG timing may be necessary. For this, a gap for (frequency)/time resynchronization/fine tuning before actual transmission and/or reception, such as for D2D discovery and communication, may be configured. In the gap, the UE may perform synchronization to be aligned with MCG timing (e.g. PCell timing or to a reference SCell in MCG) to access D2D resources.

FIG. 7 shows another example of a dual connectivity scenario for D2D operation according to an embodiment of the present invention. Referring to FIG. 7, the UE is connected to eNB1 and eNB2 by SeNB connection on frequency F2. Further, the UE is connected to MeNB by MeNB connection on frequency F1. That is, two separate frequencies for WAN operation and D2D operation may also be considered.

Currently, it is not available that timing of PCell (or timing of another SCell) is used as a reference timing for D2D operation in frequency of another SCell. However, according to an embodiment of the present invention, if it is assumed that this type of D2D operation is enabled only via configuring SeNB or dual connectivity, new behavior may be considered where reference timing of SCell (including PSCell) of SeNB for D2D operation may be based on timing of PCell of MeNB and the resource pool of SCell of SeNB may be indicated by PCell of MeNB. More specifically, utilizing timing of PCell as a reference timing may be generalized such that if a UE is enabled for D2D operation by another cell, instead of by a cell providing actual D2D resource, a UE may assume that the reference cell may be reference for timing. Alternatively, utilizing reference timing may be enabled by explicit configuration from the reference cell. Furthermore, within each CG, unless otherwise configured, a UE may assume that PCell and PSCell may be a reference cell for D2D operation when dual connectivity is configured with D2D operation. It is also feasible to configure a reference cell per each CG for D2D operation. If there are multiple D2D carriers within a CG, the reference cell may be shared or a reference cell may be configured per each D2D carrier.

From perspective of SCell of SeNB, the cell may maintain two resource pools, one of which may be used by UEs associated with the SCell via dual connectivity, and the other may be used by UEs associated with the cell via carrier aggregation without dual connectivity. The two sets may be identical.

In summary, according to an embodiment of the present invention, timing of PCell of MeNB may be used for configuring and managing resource pool, synchronization signals and/or timing, whereas SeNB physically provide resource pool for D2D operation (i.e. the actual resources used for D2D transmission and reception in the carrier used for the cellular communication to/from SeNB). It is notable that the in-coverage UE may synchronize with PCell rather than SeNB or SCell, regardless of whether SCell transmits synchronization signals or not or whether SCell is synchronized with PCell or not. Thus, synchronization signals transmitted by a D2D UE (in-coverage UE) may be based on synchronization signals of PCell rather than synchronization signals of SCell.

FIG. 8 shows an example of resource pool based on timing of PCell of MeNB according to an embodiment of the present invention. When timing of MeNB and SeNB are not synchronized, utilizing timing of PCell of MeNB as a reference timing means that the resource pool, which may not be aligned with SeNB subframe boundary, may need to be created. For example, referring to FIG. 8, if MeNB and SeNB have X us timing difference, and if resource pool starts at M ms starting SFN=0 of PCell, actual resource pool in SeNB starts in (M*1000+X) us from SFN=0 of PSCell. In this case, one additional subframe may be used for timing alignment.

FIG. 9 shows another example of resource pool based on timing of PCell of MeNB according to an embodiment of the present invention. If DL timing is used for D2D operation where PCell of MeNB may have large propagation delay (e.g. 300 us for 100 km cell range), additional gap may need to be considered for resource pool creation by SeNB. For example, the gap may be added based on the maximum propagation delay of PCell and/or PSCell. For example, referring to FIG. 9, if maximum propagation delay of PCell is 300 us whereas that of PSCell is 30 us, and the propagation delay from PCell to PSCell (or distance difference between PCell and PSCell) is about 100 us, minimum 70 us propagation delay may be considered in creation of resource pool by SeNB.

FIG. 10 shows another example of resource pool based on timing of PCell of MeNB according to an embodiment of the present invention. Utilizing timing of PCell as reference timing where to locate resource pool may be considered. However, actual resource pool may follow timing of PSCell of SeNB. In this case, a UE would have uncertainly window of roughly [−500 us, 500 us] for resource pool of PSCell. Before utilizing the resource pool, thus, the UE may synchronize with PSCell. Once it is synchronized with PSCell, the UE may expect periodic occurrence of resource pool per configuration. In this case, MeNB may configure a set of D2D resource pool which may be configured by SeNB under MeNB control such that the resource pool location may not change even though SeNB changes.

If this approach is used, the D2D communication/discovery between UEs associated with different SeNB may not be easily feasible due to misaligned timing between different SeNBs. However, the approach may guarantee that resource pools are common among neighbor eNBs, and thus, with some uncertainty, it may locate other UEs transmitting D2D discovery/communication signals. Depending on UEs capability or network configuration, a UE may maintain more than one timing reference for D2D discovery/communication.

FIG. 11 show a method for performing a D2D operation according to an embodiment of the present invention. Above description of a method for performing D2D operation in dual connectivity scenario may be applied to this embodiment. Or, a method for performing D2D operation in multiple-carriers scenario may be applied to this embodiment.

In step S100, the UE receives a configuration of a reference timing for a cell of a first carrier, based on a timing of a PCell of a second carrier. The first carrier may correspond to a SeNB in dual connectivity, and the second carrier may correspond to a MeNB in dual connectivity. The cell of the first carrier may include a PSCell.

The UE may further receive a resource pool for the D2D operation. The resource pool for the D2D operation may be indicated by the PCell of the second carrier or the cell of the first carrier. The resource pool for the D2D operation may be configured based on the reference timing and a timing difference between the first carrier and the second carrier. This may correspond to the embodiment shown in FIG. 8 above. Or, the resource pool for the D2D operation may be configured based on the reference timing and a gap for propagation delay. The gap for propagation delay may be based on a maximum propagation delay between the PCell of the second carrier and a PSCell of the first carrier. This may correspond to the embodiment shown in FIG. 9 above. Or, the resource pool for the D2D operation may be configured regardless of the reference timing. This may correspond to the embodiment shown in FIG. 10 above.

In step S110, the UE performs D2D operation with another UE on the cell of the first carrier according to the reference timing.

Further, when eNB-driven scheduling for D2D operation is used (e.g. D2D communication with Mode 1 or D2D discovery with Type 2), the D2D operation needs to be clarified. In this case, at least one of the followings may be considered.

(1) Only PCell may schedule D2D operation where physical resource of SCell is to be used. This is similar to cross-carrier scheduling in which PCell transmits scheduling assignment (SA) but actual D2D operation based on the SA occurs in SCell resource rather than PCell resource. In terms of transmitting SA by PCell, the resource for SA may be based on D2D resource pool of PCell configured by PCell. Since PCell may have multiple SCells including PSCell, carrier indicator field (CIF)-type triggering may be used to indicate which SCell is targeted for the transmitted SA.

(2) SCell may schedule D2D operation (similar to self-scheduling) where the timing of D2D operation may be based on timing of PCell rather than timing of SCell, as described above.

(3) SCell may schedule D2D operation where the timing of D2D operation may be based on timing of SCell. In this case, resource pool for Mode 1 and Mode 2 may be independently configured and managed. In other words, timing of resource pool for Mode 2 may be based on timing of PCell, whereas timing of resource pool for mode 1 may be based on timing of SCell when the resource pool is configured by SCell.

Further, in terms of configuration of dual connectivity considering D2D operation, one of the following options may be considered. Here, it is assumed that only one carrier (PSCell) is configured. However, this may also be expanded for any other SCell without loss of generality as well.

(1) PSCell may be configured with deactivated. This case may also support a UE which may not support activated PSCell (e.g. either a UE does not support dual connectivity but supports this option for D2D operation, or a UE supports 'm' DL carrier aggregations where a UE is already configured 'm' carriers and thus additional PSCell cannot be activated). In this case, all the configurations including D2D resource pool may be configured to a UE and PSCell may not be activated. Thus, a UE may not expect any DL nor UL reception/transmission from PSCell. In this case, to enable D2D operation, a UE may assume that D2D operation is enabled if D2D resource pool is configured or explicit indication of D2D operation enabling may be configured.

(2) PSCell may be configured and activated where UL transmission of PSCell is disabled. In this case, HARQ-ACK of PSCell may be transmitted via another UL.

(3) PSCell may be configured and activated including UL where D2D operation occurs in another SCell of either MCG or SCG.

Regardless of which option is used, the mechanism of timing described above may be applied (e.g. reference timing for D2D operation is based on timing of PCell or timing of SCell).

Hereinafter, a method for controlling D2D transmission power for D2D operation in dual connectivity is proposed according to embodiments of the present invention. Currently in dual connectivity, P_MeNB and P_SeNB are configured when dual connectivity is configured. P_MeNB/P_SeNB are used as a guaranteed power for MeNB and SeNB respectively, if any UL transmission is scheduled in a subframe. When D2D operation is used in addition to dual connectivity, how to allocate transmission power on D2D operation needs to be clarified. Since traffic for WAN operation needs to be protected regardless of D2D operation, UL WAN operation may be prioritized over D2D operation. When dual connectivity is configured, D2D operation may be enabled in PSCell or SCell. Various methods for allocating D2D transmission power for D2D operation may be proposed as follows.

First, a case of power control mode (PCM) 1 is described. When PCM 1 is configured, MCG and SCG is synchronized within 33 us. Assuming D2D operation may be looked-ahead (i.e. the UE knows expected power or scheduling information of overlapped D2D operation and WAN operation), D2D operation may have the lowest priority than any other WAN operation. In other words, D2D transmission power may be allocated up to (PCmax—{power allocated to WAN operation including sounding reference signal (SRS)}). Alternatively D2D operation just may have higher priority than SRS.

Alternatively, assuming D2D operation cannot be looked-ahead (i.e. the UE may not look-ahead scheduling/power request of the next overlapped subframe), which is similar to PCM 2 described below, a guaranteed D2D transmission power may be considered. In other words, the D2D transmission power may be limited by the configured guaranteed/maximum D2D transmission power. Since WAN operation should not be deprioritized over D2D transmission, the next overlapped WAN operation may allocate power assuming no D2D operation. In actual transmission, if the total power allocated to WAN operation and D2D operation exceeds PCmax, the UE may drop D2D operation. That is, for allocating D2D transmission power, min {requested/desired D2D transmission power, the guaranteed/maximum D2D transmission power} may be used. Further, if the total power allocated to WAN operation and D2D operation at the given moment exceeds PCmax, D2D operation may be dropped. Otherwise, D2D operation may be performed with the allocated D2D transmission power.

Alternatively, D2D transmission power may also be protected by P_xeNB. More specifically, at least the remaining power on xCG based on P_xeNB may be allocated to D2D operation even if yCG may request higher power than P_yeNB. For example, it is assumed that if 50% power is allocated to MCG and MCG transmission requires 30% power. Further, it is assumed that SCG requires 60% power. In this case, when D2D operation requires 30%, D2D transmission power may be allocated with at least 20% power. In other words, in terms of the remaining power, the priority may be in WAN operation whereas D2D operation may be protected by the guaranteed power allocated to each CG.

Second, a case of PCM 2 is described. When PCM 2 is configured, MCG and SCG may not be synchronized within 33 us. Assuming D2D operation is enabled in xCG and xCG is greater than 0 (i.e. guaranteed power is allocated to xCG), D2D transmission power may be limited by (P_xeNB—power allocated to WAN operation in xCG). That is, D2D transmission power may be limited by the remaining power in xCG assuming P_xeNB is the maximum power in xCG, thus the remaining power cannot be allocated to D2D operation.

Alternatively, D2D transmission power may be limited by (PCmax—P_yeNB—power allocated to WAN operation in xCG). That is, D2D transmission power may be limited by the maximum power and reserved power for the other CG and power allocated in the same CG, thus the remaining power may be allocated to D2D operation. In terms of allocating the remaining power, if D2D operation occurs earlier than WAN operation, the remaining power may be allocated to D2D operation. Or, in terms of allocating the remaining power, if there is no WAN operation in both overlapped subframes requiring the remaining power (i.e. power is sufficiently allocated to WAN operation in both overlapped subframes), then the remaining power (i.e. D2D transmission has the lowest priority than any other WAN operation) may be allocated to D2D operation.

Additionally, a maximum D2D transmission power may also be considered where the D2D transmission power may be restricted min {maximum D2D transmission power, allocable power described above}.

If explicit division multiplexing (TDM) approach is used between D2D operation and WAN operation, in the subframe where D2D operation is allowed, WLAN transmission power may be set to zero (0). If TDM is used, in a subframe which is configured to guarantee D2D transmission power, D2D operation may have higher priority than any other WAN operation. In other words, regardless of configuration of guaranteed power, the remaining power or up to PCmax may be allocated to D2D operation. Further, some variations of TDM may also be considered. For example, TDM between D2D and SCG (or SCell) may be considered where a UE may assign higher priority on D2D operation than SCG (or SCell) transmission in subframes configured to prioritize D2D operation. If this is configured, a UE may schedule high priority D2D traffic in those subframes configured to give higher priority on D2D operation than all or subset of activated WAN operation.

It is also noted that subframe boundary of D2D operation and WAN operation may not be aligned. In that case, a UE may assign higher priority on D2D operation only in subframes where D2D operation is prioritized. The configuration may be given based on subframe boundary of PCell or subframe boundary of reference cell (serving cell). If a D2D operation is overlapped with two subframes where only one subframe is configured to prioritize D2D operation, either a UE may scale the power in the middle of transmission, or a UE may take the minimum power from two subframes. In other words, higher priority for D2D operation may be applicable only to portions aligned with subframe(s) configured to prioritize D2D operation. Alternatively, it may also take the higher power between two overlapped portions. In this case, D2D operation may be higher priorized than WAN operation in at least one overlapped subframe configured to prioritize D2D operation.

Alternatively, a UE may be configured with a priority between carriers. For example, D2D operation or D2D carrier may have higher priority than SCG or SCell. This priority may be either prefixed or configured by higher layer. In that case, in terms of power allocation, D2D operation may have higher priority than a certain set of SCell(s).

It is noted that for PCmax computation, WAN operation may not account for D2D operation. Thus, a UE may have two PCmax, one of which is Pcmax1 (assuming only WAN operation) and the other is PCmax2 (assuming both WAN operation and D2D transmission). For allocating power to WAN operation, PCmax1 may be used. Whereas for allocating power to D2D operation, PCmax2 may be used.

Alternatively, the guaranteed power may be split to three categories, i.e. MCG, SCG and D2D operation. To support this, it may be assumed that for computing transmission power on transmission to SCG, P_MeNB=PCmax1−P_SeNB and P_SeNB=P_SeNB. Further, it may be assumed that for computing transmission power on transmission to MCG, P_SeNB=PCmax1−P_MeNB and P_MeNB=P_MeNB. Further, it may be assumed that for computing D2D transmission power, P_D2D=min {PCmax2−Pcmax1*P_MeNB(ratio)−Pcmax1*P_SeNB (ratio), the requested power}. That is, for D2D operation, the remaining power after reserving P_MeNB/P_SeNB may be allocated. For this, a higher layer configuration to enable this feature may be considered. It may be assumed as a UE default behavior. In case P_SeNB+P_MeNB=100% (all power is split to WAN operation), D2D operation may be disabled. This approach may also be utilized with other existing approach, e.g. the D2D transmission power may be computed as min {P_D2D+P_xeNB−power allocated to transmission in xCG, the requested power} where D2D operation occurs in xCG.

In case more than one D2D operation is scheduled at one time, the D2D transmission power may be split over multiple D2D operations. In this case, D2D operation on MCG or PCell may have higher priority than D2D operation on SCG or SCell (i.e. priority of PCell>PSCell>SCell). Or, D2D transmission power for D2D operation on MCG or PCell and D2D operation on SCG or SCell may be equally split with optional weigh factor. Alternatively, D2D operation may be treated as the lowest priority within each CG and guaranteed power per CG may be applied to D2D operation as well.

As mentioned before, when D2D carrier is configured in SCell, PCell (or MCG) may transmit SA. The benefit of SA transmission in PCell is that PCell (or MCG) can control D2D resources of SCell, and thus, potential coordination of D2D operation and WAN operation is available. It is also possible that more than one D2D operations are utilized in one D2D carrier where one D2D operation is maintained by PCell and another D2D operation is maintained by SCell or by UE. For example, if there is certain D2D operation which requires high priority, PCell may transmit SA to virtually reserve some D2D resource to that D2D operation. That D2D operation indicated by SA may have higher priority than WAN operation in SCG in terms of power allocation. In parallel, a UE may have another D2D communication or D2D discovery which may be controlled by SeNB or by UE. In summary, in terms of power-sharing, D2D resource/TX scheduled/indicated by SA transmitted in PCell (or MCG) may have higher priority over WAN operation in SCG (and also D2D operation). Other D2D operation may have the lower priority than WAN operation.

Alternatively, the network may dynamically indicate 'WAN-LO-OVER-D2D' in UL grant. If this is indicated, a UE may give lower priority on the scheduled UL WAN operation than D2D operation (if any).

FIG. 12 shows a method for performing a D2D operation in dual connectivity according to another embodiment of the present invention. Above description of a method for controlling D2D transmission power for D2D operation in dual connectivity may be applied to this embodiment.

In step S200, the UE allocates a D2D transmission power based on an UL transmission power for dual connectivity. The D2D transmission power may be allocated up to a maximum transmission power for the UE minus the UL transmission power for dual connectivity. The UL transmission power for dual connectivity may include a transmission power for a SRS. Or, the D2D transmission power may be allocated up to a guaranteed transmission power for the D2D operation. Or, the D2D transmission power may be allocated up to a remaining transmission power in each CG for dual connectivity, based on a guaranteed UL transmission power in each CG. Or, the D2D transmission power may be allocated up to a maximum transmission power for the UE regardless of the UL transmission power for dual connectivity. In this case, the D2D operation may have a higher priority than a UL transmission in a subframe.

In step S210, the UE performs D2D operation with another UE according to the D2D transmission power.

FIG. 13 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
    establishing connection with a master eNB (MeNB), and a first secondary eNB (SeNB);
    performing synchronization with a timing of the MeNB;
    receiving information on a first resource pool for a device-to-device (D2D) operation from the MeNB, wherein the first resource pool is configured on a first frequency provided by the first SeNB;
    performing the D2D operation based on the first resource pool and the timing of the MeNB;
    while maintaining connection with the MeNB, performing SeNB change from the first SeNB to a second SeNB;
    receiving information on a second resource pool for the D2D operation from the MeNB, wherein the second resource pool is configured on a second frequency provided by the second SeNB; and
    performing the D2D operation based on the second resource pool and the timing of the MeNB,
    wherein the MeNB and the SeNB are not synchronized.

2. The method of claim 1, wherein the cell of the first carrier includes a primary secondary cell (PSCell).

3. A user equipment (UE) in a wireless communication system, the UE comprising:
    a transceiver; and
    a processor, operatively coupled to the transceiver, wherein the processor is configured to:
    establish connection with a master eNB (MeNB), and a first secondary eNB (SeNB);
    perform synchronization with a timing of the MeNB;
    control the transceiver to receive information on a first resource pool for a device-to-device (D2D) operation from the MeNB, wherein the first resource pool is configured on a first frequency provided by the first SeNB;
    perform the D2D operation UE based on the first resource pool and the timing of the MeNB;
    while maintaining connection with the MeNB, perform SeNB change from the first SeNB to a second SeNB;
    control the transceiver to receive information on a second resource pool for the D2D operation from the MeNB, wherein the second resource pool is configured on a second frequency provided by the second SeNB; and
    perform the D2D operation based on the second resource pool and the timing of the MeNB,
    wherein the MeNB and the SeNB are not synchronized.

4. The method for claim 1, wherein the UE is configured to perform both wide area network (WAN) operation and the D2D operation, and further comprising:
    control transmission power for the D2D operation by prioritizing the WAN operation over the D2D operation.

* * * * *